(12) United States Patent
Brillon et al.

(10) Patent No.: US 10,760,677 B2
(45) Date of Patent: Sep. 1, 2020

(54) EPICYCLIC GEAR TRAIN WITH BALANCED CARRIER STIFFNESS

(71) Applicant: PRATT & WHITNEY CANADA CORP., Longueuil (CA)

(72) Inventors: Louis Brillon, Varennes (CA); Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 278 days.

(21) Appl. No.: 15/884,936

(22) Filed: Jan. 31, 2018

(65) Prior Publication Data

US 2019/0234510 A1    Aug. 1, 2019

(51) Int. Cl.
   F16H 57/08    (2006.01)
   F02C 7/36     (2006.01)
   F16H 1/28     (2006.01)

(52) U.S. Cl.
   CPC ............. *F16H 57/082* (2013.01); *F02C 7/36* (2013.01); *F16H 1/28* (2013.01); *F16H 1/2809* (2013.01); *F05D 2260/40311* (2013.01)

(58) Field of Classification Search
   CPC ........ F16H 57/082; F16H 1/2809; F16H 1/28; F02C 7/36
   See application file for complete search history.

(56) References Cited

U.S. PATENT DOCUMENTS

| | | | |
|---|---|---|---|
| 3,257,869 A | 6/1966 | Sharples | |
| 3,527,121 A | 9/1970 | Moore | |
| 3,635,103 A | 1/1972 | Monti | |
| 3,654,815 A | 4/1972 | Dehne | |
| 3,842,481 A | 10/1974 | Laing | |
| 3,939,736 A | 2/1976 | Morin | |
| 3,943,780 A | 3/1976 | Klaue | |
| 4,129,050 A | 12/1978 | Akashi et al. | |
| 4,271,928 A | 6/1981 | Northem | |
| 4,282,776 A | 8/1981 | Eller | |

(Continued)

FOREIGN PATENT DOCUMENTS

DE    19706686      8/1998
DE    102014206977  10/2015

(Continued)

OTHER PUBLICATIONS

European Search Report dated Oct. 14, 2019 for application No. 19154905.4.

(Continued)

*Primary Examiner* — Patrick H Mackey
(74) *Attorney, Agent, or Firm* — Norton Rose Fulbright Canada LLP

(57) ABSTRACT

An epicyclic gear train including a central sun gear, an outer ring gear, and a number of planet gears which are mounted to a planet carrier. The planet carrier includes a centrally disposed torque transfer coupling with a torque transmission point at an axial end thereof. First and second carrier plates extend radially from the torque transfer coupling and are axially spaced apart to support the planet gears therebetween at aligned gear mounting points. The first carrier plate is closer to the torque transfer point than the second carrier plate. The second carrier plate has a stiffness that is greater than that of the first carrier plate.

17 Claims, 5 Drawing Sheets

(56) References Cited

U.S. PATENT DOCUMENTS

| | | | |
|---|---|---|---|
| 4,329,130 | A | 5/1982 | Nagata et al. |
| 4,586,401 | A | 5/1986 | Nogle |
| 4,793,214 | A | 12/1988 | Nurnberger et al. |
| 4,854,184 | A | 8/1989 | Jessup |
| 4,856,377 | A | 8/1989 | Goudreau et al. |
| 4,983,152 | A | 1/1991 | Kimberlin et al. |
| 5,136,197 | A | 8/1992 | Hallett |
| 5,152,726 | A | 10/1992 | Putney et al. |
| 5,237,885 | A | 8/1993 | Putney et al. |
| 5,309,714 | A | 5/1994 | Bellman et al. |
| 5,382,203 | A | 1/1995 | McKibbin et al. |
| 5,466,198 | A | 11/1995 | Fan |
| 5,470,286 | A | 11/1995 | Lederman |
| 5,649,254 | A | 7/1997 | Mod et al. |
| 5,679,089 | A | 10/1997 | Levedahl |
| 5,928,105 | A | 7/1999 | Taha et al. |
| 6,148,605 | A | 11/2000 | Lardellier |
| 6,394,387 | B1 | 5/2002 | Mitrovic |
| 6,422,971 | B1 | 7/2002 | Katou et al. |
| 6,663,530 | B2 | 12/2003 | Poulin et al. |
| 6,837,819 | B2 | 1/2005 | Foster |
| 6,964,155 | B2 | 11/2005 | McCune et al. |
| 7,104,918 | B2 | 9/2006 | Mitrovic |
| 7,223,197 | B2 | 5/2007 | Poulin et al. |
| 8,491,436 | B2 | 7/2013 | Duong et al. |
| 8,647,229 | B2 | 2/2014 | Ai et al. |
| 8,827,863 | B2 | 9/2014 | Poon et al. |
| 8,840,508 | B2 | 9/2014 | Floren et al. |
| 9,079,317 | B2 | 8/2015 | Ai et al. |
| 9,523,424 | B2 | 12/2016 | Altamura |
| 9,702,451 | B2 | 7/2017 | Gravina |
| 9,803,742 | B1 | 10/2017 | Raju et al. |
| 9,874,150 | B2 | 1/2018 | McCune et al. |
| 2003/0008748 | A1 | 1/2003 | Fox |
| 2003/0114267 | A1 | 6/2003 | Poulin et al. |
| 2003/0162630 | A1 | 8/2003 | Poulin et al. |
| 2005/0070396 | A1* | 3/2005 | Christ .................. F16H 57/082 475/231 |
| 2010/0056321 | A1 | 3/2010 | Snyder et al. |
| 2011/0105270 | A1* | 5/2011 | Matsuoka ............. F16H 1/2836 475/331 |
| 2011/0212808 | A1 | 9/2011 | Pabst |
| 2012/0028756 | A1 | 2/2012 | Lopez et al. |
| 2013/0035194 | A1* | 2/2013 | Ai .......................... B64C 27/12 475/249 |
| 2014/0274550 | A1* | 9/2014 | Senoo .................. F16H 57/082 475/331 |
| 2015/0065285 | A1 | 3/2015 | McCune et al. |
| 2016/0097330 | A1 | 4/2016 | Venter |
| 2016/0238126 | A1 | 8/2016 | Beck et al. |
| 2016/0363211 | A1 | 12/2016 | Bradley |
| 2018/0187719 | A1 | 7/2018 | Tulokas |
| 2019/0234509 | A1 | 8/2019 | Desjardins et al. |

FOREIGN PATENT DOCUMENTS

| | | |
|---|---|---|
| EP | 0229958 | 7/1987 |
| EP | 0271416 | 6/1988 |
| EP | 0618383 | 10/1994 |
| EP | 0989316 | 3/2000 |
| EP | 1028275 | 8/2000 |
| EP | 1267095 | 12/2002 |
| EP | 1435475 | 7/2004 |
| EP | 2799674 | 5/2014 |
| EP | 3000988 | 3/2016 |
| GB | 725364 | 3/1955 |
| GB | 1420965 | 1/1976 |
| JP | 358061982 | 4/1983 |
| JP | 358156773 | 9/1983 |
| JP | 407332475 | 12/1995 |
| JP | 408270739 | 10/1996 |
| JP | 2010169226 | 8/2010 |
| WO | 2011130352 | 10/2011 |
| WO | 2018030177 | 2/2018 |

OTHER PUBLICATIONS

European Search Report dated Oct. 16, 2019 for application No. 19153919.6.

* cited by examiner

EPICYCLIC GEAR TRAIN WITH BALANCED CARRIER STIFFNESS

TECHNICAL FIELD

The present disclosure relates to gearboxes for gas turbine engines and, more particularly, to an epicyclic gear train having a planet gear carrier.

BACKGROUND

Epicyclic gear trains are frequently used in reduction gearboxes of gas turbine engines. The planet gear carriers of such epicyclic gear trains, however can be prone to torsional deflection wherein the planet carrier twists around its central axis under load, causing the individual axis of rotation of the planet gears to lose parallelism with the central axis of the carrier. This can negatively affect the efficiency and life span of the gear train.

Improvement is sought to provide a planet carrier that provides a more balanced stiffness, thereby allowing a more uniform load distribution on the two sides of each planet gear of the epicyclic reduction stage.

SUMMARY

There is accordingly provided an epicyclic gear train defining a central longitudinal axis, the epicyclic gear train comprising a central sun gear, an outer ring gear, and a number of planet gears which are mounted to a planet carrier, the planet gears rotating about respective planet gear axes, the planet gears disposed in meshed engagement with the central sun gear and the outer ring gear, the planet carrier including a centrally disposed torque transfer coupling concentric with the longitudinal axis and having a torque transmission point at an axial end of the torque transfer coupling, first and second carrier plates extending radially from the torque transfer coupling, the first and second carrier plates being parallel to each to each other and axially spaced apart to support the planet gears therebetween at aligned gear mounting points on each of the first and second carrier plates, the planet carrier having center links extending radially outward relative to the longitudinal axis and axially disposed between the carrier plates, the first carrier plate being closer to the torque transfer point than the second carrier plate, and the second carrier plate having a stiffness that is greater than that of the first carrier plate.

There is also provided an epicyclic gear train comprising a sun gear, an outer ring gear, and a number of planet gears which are mounted to a planet carrier and disposed radially between the sun gear and the outer ring gear in meshing engagement therewith to provide relative rotational motion at least between the planet carrier and the outer ring gear, the sun gear, the outer ring gear and the planet carrier being concentric with a central longitudinal axis, the planet carrier including a carrier body having a central tubular portion concentric with the longitudinal axis and first and second carrier plates extending radially outward from the central tubular portion, the first and second carrier plates axially spaced apart from each other by center links to support the planet gears therebetween, the central tubular portion defining torque transmission means at an axial end thereof, the first carrier plate being closer to the torque transmission means than the second carrier plate, and the second carrier plate having a greater stiffness than the first carrier plate.

There is further provided a gas turbine engine comprising an epicyclic gear train having at least one epicyclic reduction stage, the gear train including a central sun gear concentric with a longitudinal axis, an outer ring gear, and a number of planet gears which are mounted radially between, and are in meshed engagement with, the central sun gear and the planet gears, the central sun gear and the outer ring gear configured for relative rotation with respect to the planet gears, the planet gears rotatably mounted to a planet carrier including a torque transfer coupling centrally disposed concentrically with the longitudinal axis and carrier plates disposed radially outward from the torque transfer coupling, the carrier plates being axially spaced apart from each other and connected to the torque transfer coupling by center links, the center links disposed axially between the carrier plates and radially extending away from the torque transfer coupling, the center links having radially outer ends which terminate at a radially outer perimeter of the carrier plates such that the center links are entirely radially disposed within the radially outer perimeter of the carrier plates.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
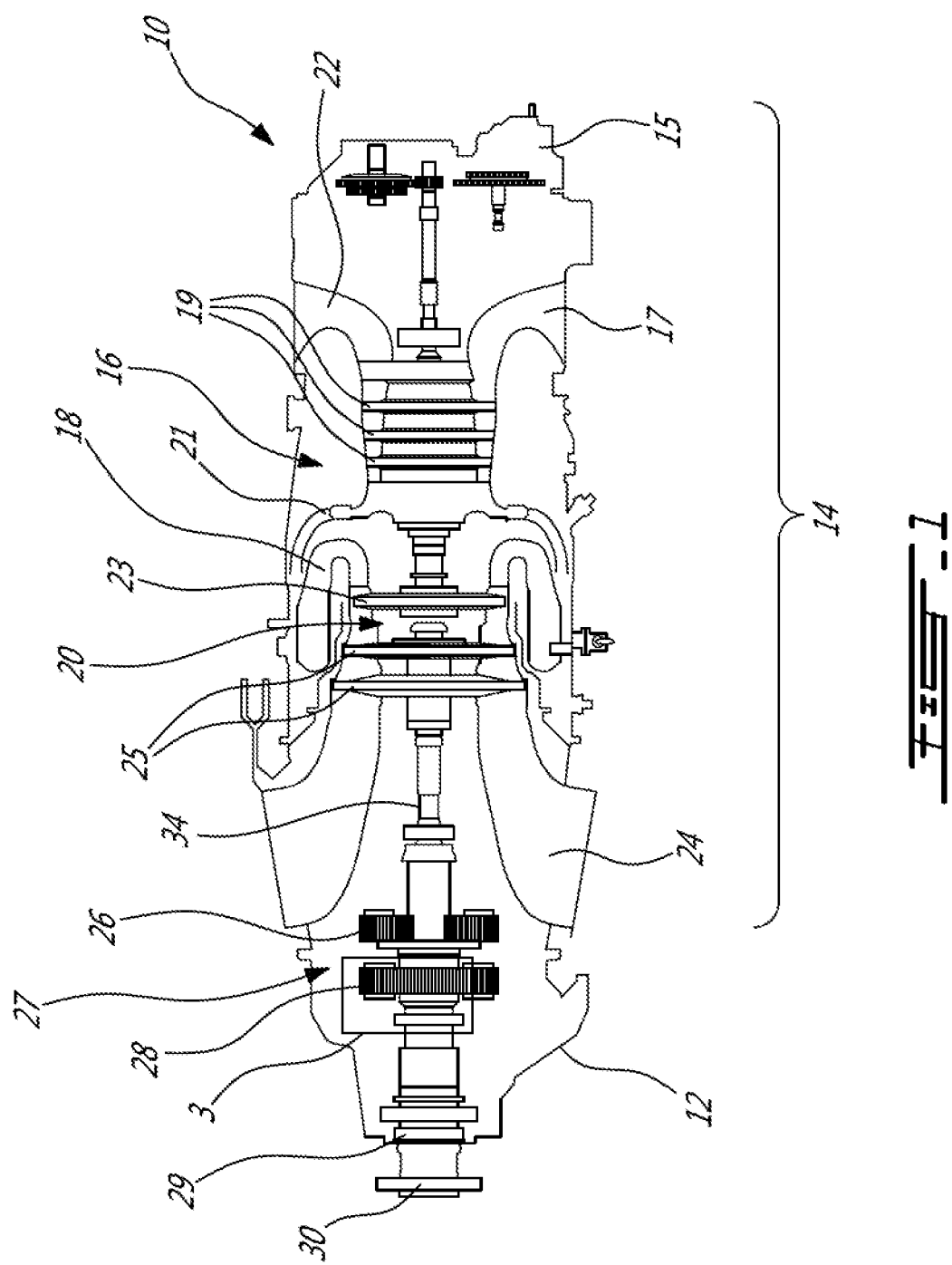
FIG. 1 is a schematic cross-sectional view of a gas turbine engine having a reduction gearbox with an epicyclic gear train.

Referring to FIG. 1, a turboprop gas turbine engine 10 generally having a power plant 14 and a reduction gearbox (RGB) 12. The engine power plant 14 includes a compressor section 16, combustion chamber 18, and a turbine section 20. Air inlets 22 permit air to be drawn into the gas generator and, following power withdrawal by the turbine section, exhaust ducts 24 provide an engine exhaust gas outlet. While the exemplary turboprop gas turbine engine 10 as depicted in FIG. 1 is of the type having an inversed configuration (i.e. air inlet towards the rear of the engine and the exhaust ducts 24 towards the front of the engine), it is to be understood that other configurations of the gas turbine engine 10, and the power plant portion 14 in particular are within the scope of the present disclosure. The reduction gearbox 12 as described herein, and more particularly the epicyclic gear train 27 thereof, can be used in conjunction with any number of gas turbine engine types and configurations, including both turboprop and turboshaft engines. Further still, the epicyclic gear train as described herein can be used in a turbofan gas turbine engine, despite it not having a full reduction gear box as in turboshafts and turboprops.

Referring to FIG. 1, the operation of such an airborne gas turbine engine 12 is well known, and occurs generally as follows, by means of example only. Air enters the engine through the inlet 17 and is compressed by the compressor section 16, in this case comprising axial flow compressors 19 and a centrifugal compressor 21. The compressed air is then fed to the combustion chamber 18 where it is mixed with fuel and ignited. The hot gas then expands through the turbine section 20, before being discharged to the atmosphere through exhaust ducts 24. The turbine section 20 in this exemplary embodiment is comprised of a compressor turbine 23 and a power turbine 25. The compressor turbine 23 drives the compressor 18 and the accessories through accessory gearbox 15. The power turbine 25, which is mechanically independent from the compressor turbine 23 and the reduction gearbox 12, ultimately drives the propeller of the engine 12 via the propeller shaft 29 at the output of the gearbox 12.

In the embodiment of FIG. 1, the exemplary reduction gearbox 12 includes an epicyclic gear train 27 having two reductions stages, namely a first reduction stage 26 that receives input from the power plant 14 through power turbine output shaft 34, and a second reduction stage 28 that receives power/torque from the first reduction stage 26, thereby further reducing the rotational speed before transmitting torque to an output propeller shaft 29. The output of the second reduction stage 28 of the epicyclic gear train 27 therefore drives a propeller (not shown), which is adapted to be fastened to a propeller flange 30 disposed at the forward end of the propeller shaft 29. The gear train 27 is an epicyclic gear train, in that one or more of the reductions stages 26, 28 thereof includes an the epicyclic gear train configuration as described herein.

While different configurations for reduction gearboxes and gear trains used therein exist, the reduction gearbox 12 and the gear train 27 of the present disclosure are respectively an epicyclic gearbox and an epicyclic gear train, in that they include one or more reduction stages that comprise an epicyclic configuration. While the terms "planetary" and "epicyclic" with respect to such gear trains and gearboxes are both used in the art and are generally understood interchangeably to refer to the same type of gear train and/or gearbox, the term "epicyclic" will be used herein.

The second reduction stage 28 will generally be described herein with reference to the epicyclic gear train 27 of the present disclosure, however it is to be understand that the features of the epicyclic gear train and the planet carrier thereof as described herein can similarly be employed as part of the first (or other) reduction stage of the RGB 12. Similarly, as noted above, the epicyclic gear train configuration and the elements thereof as described herein can be employed in a turbofan gas turbine engine, despite it not comprising a full reduction gear box as in turboshafts and turboprops.

As will be seen, in the depicted embodiment, the second reduction stage 28 of the epicyclic gear train 27 within the RGB 12 of the gas turbine engine 10 is an epicyclic reduction stage that generally comprises a central sun gear, an outer ring gear, and at least two (but typically three or more) planet gears supported by a planetary carrier, all of which are described in further detail below.

Figure 2:
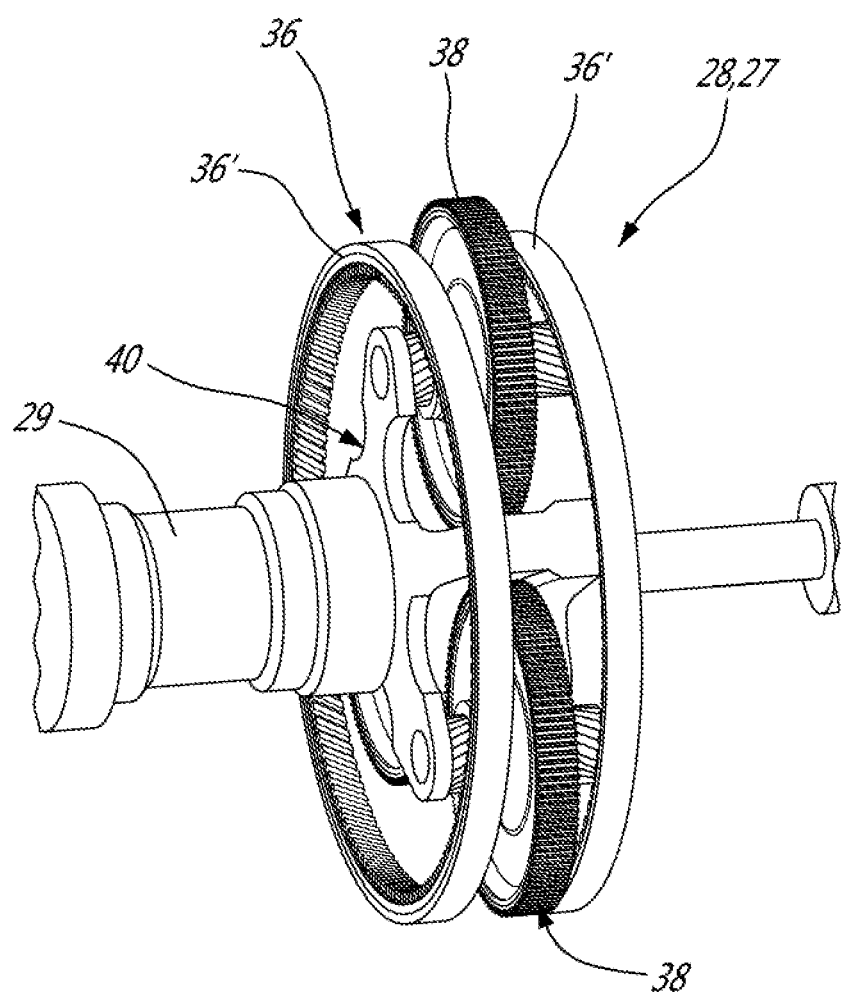
FIG. 2 is a perspective view of an epicyclic reduction stage of the epicyclic gear train of the gas turbine engine in FIG. 1, having a planet carrier in accordance with an embodiment of the present disclosure.
Figure 3:
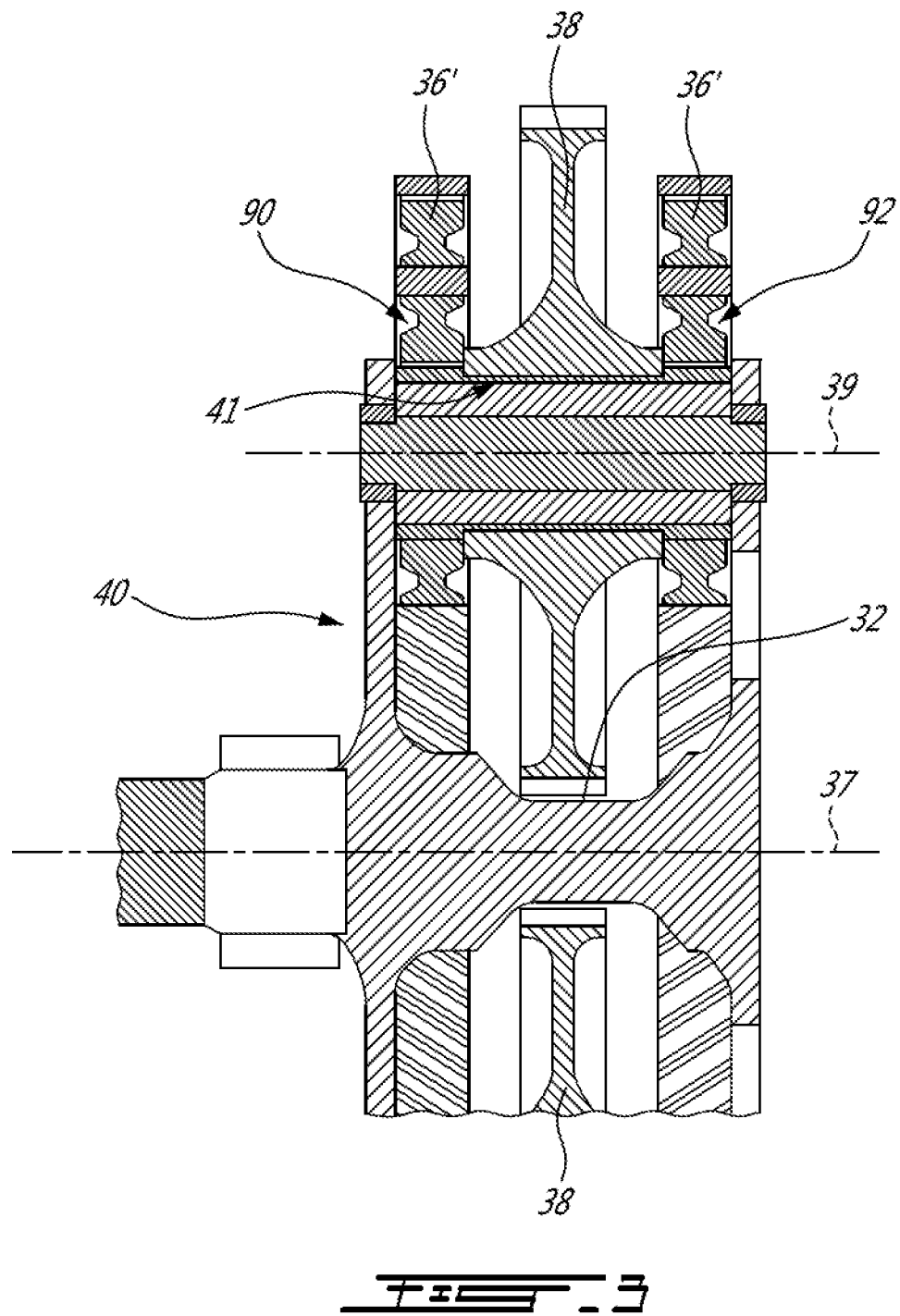
FIG. 3 is an enlarged, partial cross-sectional view of the epicyclic reduction stage of FIG. 2, taken from region 3 in FIG. 1.

Referring to FIGS. 2 and 3, the second epicyclic reduction stage 28 of the epicyclic gear train 27 includes generally a central sun gear 32 (best seen in FIG. 3), outer ring gear(s) 36, and a plurality of (in this case, three) planet gears 38 which are in meshing engagement with both the sun gear 32 and the outer ring gear(s) 36 (36'). In the depicted embodiment, the outer ring gear 36 is a split gear, in that it includes two outer ring gear portions 36' which are axially spaced apart, each meshing with axially aligned gear teeth on axially opposite sides of the planet gears 38, for better load distribution and torque transfer. The planet gears 38 are supported within the ring gear 36 by a torque-transferring planet carrier 40, to which the planet gears 38 are rotatably mounted via journal bearings 41 for rotation about respective planet axes of rotation 39.

As seen in FIG. 3, each planet gear 38 is rotatably mounted in the planetary carrier 40 about a planet axis 39 and is in meshing engagement with both the (radially inward) sun gear 32 and the (radially outward) ring gear(s) 36 (36'). The sun gear 32, ring gear(s) 36(36'), and planet carrier 40 are all concentric about a longitudinally-extending central axis 37. Each planet gear 38, which is mounted to and supported by the planet carrier 40 via journal bearings 41, rotates about its own individual axis of rotation 39. In one possible epicyclic gear train configuration, both the sun gear 32 and planet carrier 40, in operation, rotate about this longitudinal axis 37 while the outer ring gear 36 remains rotatably fixed. In this configuration, the rotating planet gears 38 collectively rotate the planet carrier 40 about the central axis 37, when driven by the sun gear 32. In alternate epicyclic configurations, however, the outer ring gear 36 may not be fixed (i.e. the ring gear 36 may rotate about the longitudinal axis 37), in which case either the planet carrier 40 or the sun gear 32 instead remains rotatably fixed, while the other rotates. As will be appreciated, for any epicyclic reduction stage, two of the three main components (i.e. sun gear, ring gear and planet carrier) rotate, while the third component is held rotationally fixed relative to the other two. In all cases, however, the planet gears 38 rotate about their respective axes 39 and torque is transferred through the planet carrier 40.

Figure 4:
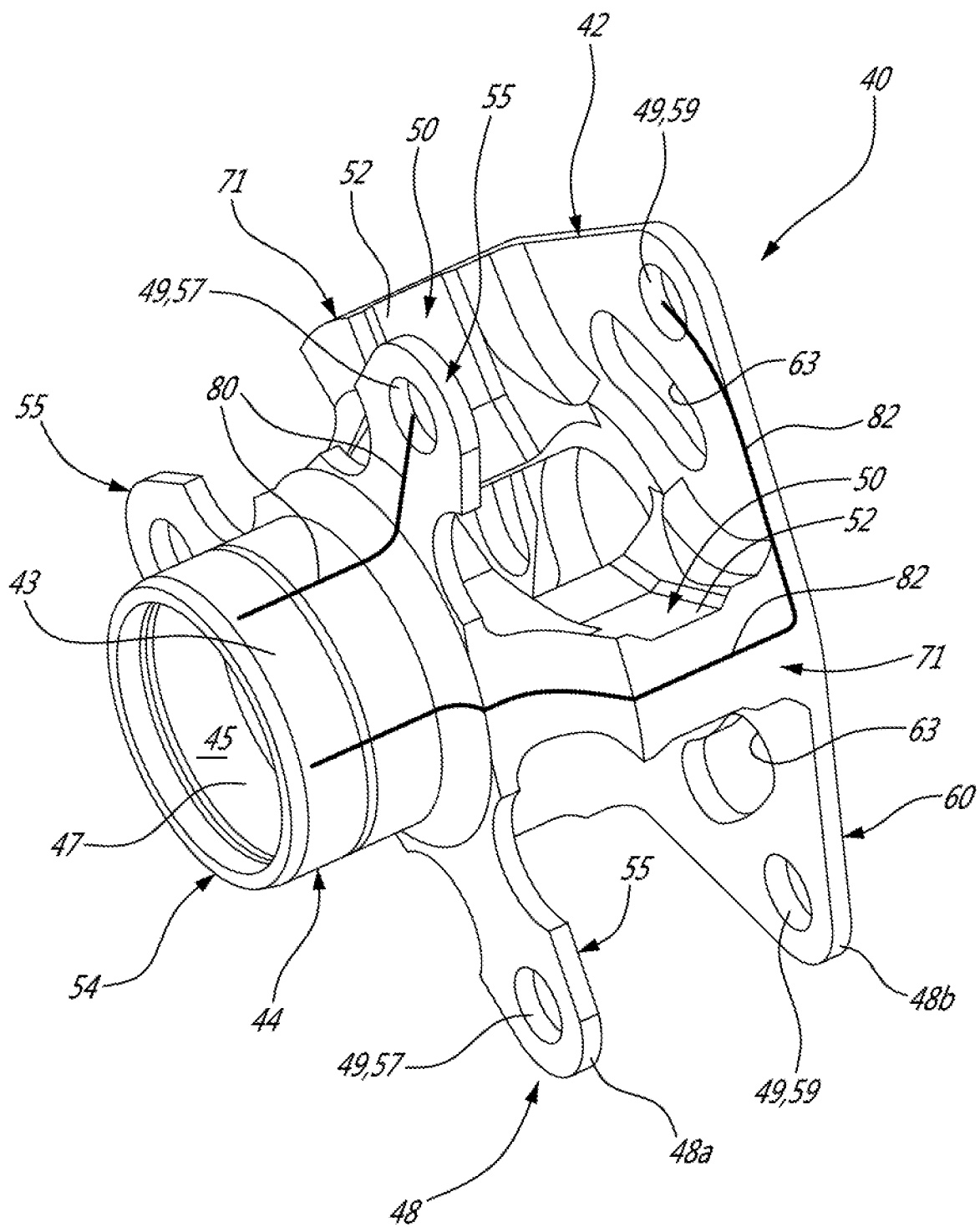
FIG. 4 is a perspective view of the planet carrier of the epicyclic reduction stage of FIGS. 2 and 3.

Referring now to FIG. 3-4, the planet carrier 40 will be described in greater detail.

The planet carrier 40 of the present disclosure may be configured to better balance the stiffness along the torque paths extending therethrough, in order to provide a more uniform load distribution on the two sides of the planet gears 38 and thus on each of the plates 48a, 48b of the planet carrier 40. Such a more uniform load distribution, permitted by the configuration of the planet carrier that enables stiffness balancing as will be described, may further optimize gear durability and thus reduce the probability of bearing touch down or other life span limiting occurrences. The present planet carrier may help to improve the power to weight ratio for the gear train 27, and thus the gearbox 12 within which it is found.

The planet carrier 40 is monolithic, in that its body 42 is integrally formed as a one-piece component (i.e. the carrier body 42 is monolithic). The body 42 of the planet carrier 40 may, for example, be machined from a single piece of material, however other suitable manufacturing methods may also be used to form the planet carrier 40 as a single, one-piece, component (e.g. additive manufacturing, casting, molding, etc.).

The monolithic body 42 of the present planet carrier 40 includes generally a torque transfer coupling 44, carrier plates 48 which in this case include first and second carrier plates 48a and 48b, and a number of center links 50 interconnecting the carrier plates 48a, 48b and the torque transfer coupling 44.

The torque transfer coupling 44 is centrally disposed within the body 42 of the planet carrier 40, concentrically with the longitudinal center axis 37. A central tubular portion 43 thereof defines a central bore 45 that axially extends at least partially therethrough. A coupling end 54 of the central tubular portion 43, which provides the torque transmission means as described herein, is adapted to matingly receive therein, and rotatably engage via splines 47 formed within the opening to the central bore 45, the propeller shaft 29 providing the output from the RGB 12. In the case where the planet carrier 40 forms part of a first reduction stage 26 in a multi-stage gear train or gearbox, then the coupling end 54 of the central tubular portion 43 is configured to engage the input to the next reduction stage (such as a shaft driving a sun gear for another epicyclic reduction stage). Alternate embodiments are also possible, for example wherein the planet carrier 40 does not drive either the propeller shaft 29 or another downstream reduction stage, e.g. wherein the coupling end 54 serves as a torque input rather than a torque output, or wherein the coupling end 54 is engaged with a mating coupling shaft that prevents rotation of the planet carrier 40. Regardless of the configuration, this coupling end 54 of the torque transfer coupling may also be referred to herein as the torque transmission point 54 of the planet carrier 40, as the torque transmitted from (as torque output) or to (as torque input) will occur at this point of the planet carrier, with the mounting points 57, 59 of the planet gears 38 forming the respective other torque input or torque output points to the carrier 40.

As can be appreciated from FIG. 4, the two carrier plates 48a and 48b, which respectively provide support for each axial side of the planet gears 38, via their journal bearings 41, differ from each other. More specifically, as can be seen in FIG. 4, the first carrier plate 48a, which in the depicted embodiment is disposed on an axially forward (or front) end of the planet carrier 40, is circumferentially split such that it includes several distinct radially extending finger segments 55. The first carrier plate 48a in this embodiment is therefore really a number (in this case, three) of finger segments 5 which lie in a common plane, and which are therefore circumferentially spaced about the planet carrier. Each of these finger segments 55 includes a planet gear axle opening 49 in a radially outer end thereof, which forms a forward attachment point 57 for one of the planet gears 38. In contrast, the second carrier plate 48b, which in the depicted embodiment is disposed on an axially rearward (or rear) end of the planet carrier 40, is formed by a single, planar, plate that is substantially circumferentially uninterrupted (with the exception of the weight-saving openings 63 formed therein, as seen in FIG. 4) and includes a number (in this case, three) of planet gear axle opening 49 formed at circumferentially spaced apart locations therein in alignment with the corresponding openings 49 in the finger segments 55 forming the first carrier plate 48a. The planet gear axle openings 49 in the second carrier plate 48b according form rear attachment points 59 for each of the respective planet gears 38.

The carrier plates 48a and 48b both however extend radially away form the central tubular portion 43 of the torque transfer coupling 44, and are substantially perpendicular to the central axis 37. The carrier plates 48a, 48b are axially spaced apart from each other to receive therebetween the planet gears 38, which are supported on axially opposed ends by the carrier plates 48a and 48b, at the front and rear attachment points 57 and 59 thereon, respectively. The number of pairs of planet gear axle openings 49 which are aligned with each other in the carrier plates 48a, 48b corresponding to the number of planet gears 38 (which in this case is three). As noted above, the openings 49 in opposed plates 48a and 48b are in radial and circumferential alignment with each other, concentrically disposed with, and defining, the individual axes of rotation 39 of the planet gears 38.

The planet gear openings 49 and thus the planet gears 38 mounted therewithin are circumferentially equidistantly spaced about the body 42 of the planet carrier 40, and are radially disposed a common distance relative to the central axis 37. In the depicted embodiment, therefore, three planet gears 38 are provided and thus the individual axes of rotation 39 thereof, as defined by the planet gear openings 49 in the carrier plates 48a, 48b, are circumferentially spaced apart by 120 degrees about the central axis 37. Each of the planet gears 38 is rotatably mounted to the carrier plates 48a, 48b by axles and/or bearings 41, such as the journal bearings 41 for example, which extend through the aligned pairs of planet gear openings 49 to rotatably support each of the planet gears 38.

The monolithic body 42 of the planet carrier 40 also includes a number of center links 50 which are integrally formed with, and interconnect, the first and second carrier plates 48a, 48b and the torque transfer coupling 44. More particularly, each of the center links 50 extends radially outwardly from the longitudinal axis 37 and extends axially between the carrier plates 48a, 48b to interconnect them. Each center link 50 is circumferentially disposed between two planet gears 38, and therefore the center links 50 are circumferentially offset from the openings 49 in the carrier plates 48 within which the journal bearings 41 of the planet gears 38 are mounted. Each of the center links 50 terminate, at their radially outermost ends 52, to form an integrally formed bridge 71 extending axially between the spaced apart first and second carrier plates 48a, 48b. In the depicted embodiment, the outer ends 52 of the center links 50 thus terminate at, and do not extend radially beyond, a radially outer perimeter 60 of the carrier plates 48a, 48b. Additionally, in one particular embodiment, the first and second carrier plates 48a, 48b are connected to the torque transfer coupling 44 (which may include the central tubular portion 43) only by the center links 50.

The center links 50 of the planet carrier 40 therefore define therethrough a torque path 82 (which will be described in further detail below) through which torque is transmitted during operation of the epicyclic gear train 27 between the splines 47 at the torque transmission point 54 of planet carrier and the second carrier plate 48b, which is the furthest away from the coupling end. The center links 50 are centered axially between the carrier plates 48a, 48b supporting the planet gears 38, via axles or bearings (e.g. the journal bearings 41) of the planet carrier 40. The carrier plates 48a, 48b supporting opposed sides of the planet gears 38 are "decoupled" from each other and from the torque transmitted through the body of the planet carrier during operation.

Referring still to FIG. 4, the monolithic body 42 of the planet carrier 40 defines two different torque paths 80 and 82 which extend respectively through the first and second carrier plates 48a and 48b, as will now be seen. The properties and/or geometric configuration of the planet carrier 40 are configured such that these two torque paths 80 and 82 are substantially balanced. This is at least partly made possible by providing each of the first and second carrier plates 48a and 48b (which in this embodiment are the front and rear carrier plates, respectively) with a different stiffness.

The torque paths 80 and 82 are depicted for understanding purposes by lines extending through the carrier 40 in FIG. 4, however it is to be understood that these torque path lines 80 and 82 are not visibly present on the carrier 40 but are shown in FIG. 4 for the purposes of understanding the load and stiffness balance made possible by the configuration of the present planet carrier 40. As shown in FIG. 4, a first torque path 80 of the planet carrier 40 extends between the torque transmission point 54 of the torque transfer coupling 44 and the first carrier plate 48a having thereon the front planet attachment points 57. A second torque path 82 of the planet carrier 40 extends between the coupling end 54 of the torque transfer coupling 44 and the second carrier plate 48b having thereon the rear planet attachment points 59. As can be appreciated from FIG. 4, the first torque path 80 is shorter than the second torque path 82, given that the second torque path 82 has a greater distance to cover between the torque transmission point 54 and its respective rear planet attachment points 59. More specifically, the second torque path 82 extends first axially through the central tubular portion 43 of the torque transfer coupling 44, then radially outward through the center links 50, then axially through the bridges 71 formed at the radially outer ends 52 of the center links 50, and then (given the circumferential offset between each of the center links 50 and the planet gear journal bearings 41) circumferentially through the second carrier plate 48b to the openings 49 forming the rear planet attachment points 59. In contrast, the first torque path 80 extends first axially through the central tubular portion 43 of the torque transfer coupling 44, then simply radially outward through the respective finger portions 55 forming first carrier plate 48a to reach the openings 49 forming the front planet attachment points 57. The first torque path 80 is therefore said to be a more direct torque path from the splines 47 at the torque transmission point 54 of the carrier to one side the planet gears 38, whereas the second torque path 82 is a more indirect torque path from the splines 47 at the torque transmission point 54 of the carrier to the other side of the planet gears 38.

In order to balance these two torque paths 80 and 82 within the planet carrier 40, the first carrier plates 48a is less stiff than the second carrier plate 48b. Stated differently, the second carrier plate 48b has a higher stiffness than the first carrier plate 48a. Accordingly, in this particular embodiment, the stiffness ratios of the two torque paths 80 and 82 is geometrically balanced so that the reaction forces on each side of the planet gears 38, and therefore on each of the front gear mesh point 90 and the rear gear mesh point 92 (i.e. the respective front and rear sides of the meshing between the planet gears 38 and the outer ring gear 36—see FIG. 3) are substantially balanced. Because the torque transferred through the carrier will naturally tend to want to follow the shortest distance between the planet gear reactions points 57, 59 and the spline 47 at the torque transmission point 54 (which provides the torque input or output to/from the carrier, depending on the configuration), the torque transferred through the shorter first torque path 80 will naturally transfer more load if the two carrier plates 48a and 48b were of equal stiffness. However, by making the first carrier plate 48a (which is closer to the torque transmission point 54 of the carrier 40) of the present carrier 40 less stiff that the second carrier plate 48b (which is further away from the torque transmission point 54 of the carrier 40), the loads created within the two torque paths are more equally distributed and therefore any effects caused by the unequal-length torque paths 80 and 82 can be substantially neutralized. In short, by making the carrier plate exposed to higher torque (due to the shorter torque path) less stiff, and making the carrier plate exposed to lower torque (due to the longer torque path) more stiff, the overall loads imposed on the planet carrier can be more evenly distributed throughout the planet carrier 40. The loads imposed on the front carrier plate 48a and the rear carrier plate 48b of the planet carrier 40 are therefore more evenly distributed, due to the relative different in stiffness between the two carrier plates 48a and 48b, and thus stress distribution within the planet carrier 40, and the planet gears 38 supported thereby, is better optimized. Additionally, better alignment between the gears 32, 36, 38 of the epicyclic gear train 27, and the journal bearings 41 on which the planet gears 41 rotate, may be possible.

Various geometric configurations may be used to achieve the above-described stiffness balance (i.e. a load balance via relative stiffness differential) between the first carrier plate 48a and the second carrier plate 48b. In the depicted example of FIG. 4, for example, the first carrier plate 48a is less stiff than the second carrier plate 48b because the first carrier plate 48a is circumferentially discontinuous, as noted above, being formed by the radially extending finger portions 55, whereas the second carrier plate 48b extends circumferentially fully about the planet carrier. The second carrier plate 48b may therefore said to be "larger", or more massive (i.e. it occupies a greater overall volume in space) than the first carrier plate 48a. Consequently, the shape and configuration of these finger portions 55 renders them collectively less stiff than the more massive, and circumferentially unified and reinforced (e.g. by the center links 50) structure forming the second carrier plate 48b. In an alternate embodiment, as will be described further below with reference to FIG. 5, the second carrier plate 48b, defining the longer torque path 82, may having a greater axial thickness than the first carrier plate 48a, defining the shorter torque path 80. Alternately, other structurally reinforcing features, such as gussets, ribs, etc., may be provided on the second carrier plate 48b, in order to ensure that it is stiffer than the first carrier plate 48a. Alternately still, the second carrier plate 48b may be provided with material properties such that it is stiffer that the first carrier plate 48a. As will be appreciated, various geometric, material and structure properties may be used to ensure that the second carrier plate 48b is stiffer than the first carrier plate 48a.

Figure 5:
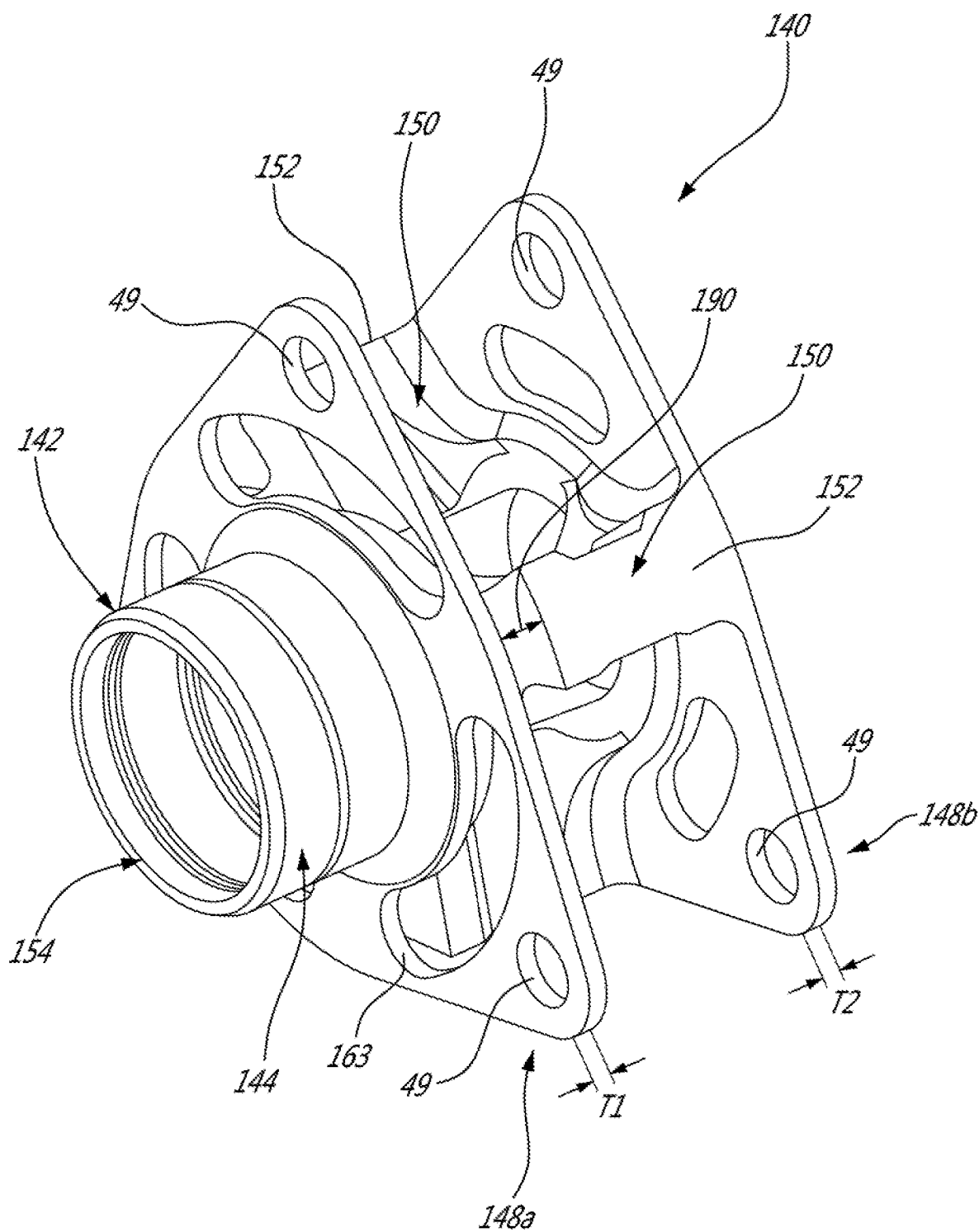
FIG. 5 is a perspective view of a planet carrier in accordance with another embodiment of the present disclosure, for use in an epicyclic reduction stage of the epicyclic gear train of a gas turbine engine.

Referring now to FIG. 5, an alternate planet carrier 140 of the present disclosure is shown. The planet carrier 140 is similar to the planet carrier 40 described above in many respects, however the planet carrier 140 has a carrier body 142 with an alternate configuration, as will now be described.

The planet carrier 140 similarly provides a stiffness balance (i.e. a load balance via relative stiffness differential) between a first carrier plate 148a, that is located closest to the torque transmission point 154 of the planet carrier 140, and the second carrier plate 148b, that is located further away from the torque transmission point 154 than the first carrier plate 148a. Accordingly, the torque path (not graphically shown in FIG. 5) extending through the second carrier plate 148b will be longer than the torque path extending through the first carrier plate 148a. In this embodiment, however, the second carrier plate 148b of the planet carrier 140 has an axial thickness T2 that is greater than an axial thickness T1 of the first carrier plate 148a, thereby making the second carrier plate 148b stiffer than the first carrier plate 148a. In this configuration, therefore, the first and second carrier plates 148a, 148b are more geometrically (at least in perimeter shape) similar—but they have different thickness in order to ensure that the second carrier plate 148b is thicker, and thus stiffer, that the first carrier plate 148a. The first carrier plate 148a therefore does not comprise the circumferentially discontinuous finger portions 55 of the carrier 40, and instead is formed by a single, planar, plate that is substantially circumferentially uninterrupted (with the exception of the weight-saving openings 163 formed therein). In an end elevation view, therefore the first and second carrier plates 148b may appear substantially identical in shape and perimeter profile.

Much as per the planet carrier 40, the planet carrier 140 also includes a number of center links 150 which are integrally formed with, and interconnect, the first and second carrier plates 148a, 148b and the torque transfer coupling 144. More particularly, each of the center links 150 extends radially outwardly from the longitudinal axis 37 and extends axially between the carrier plates 148a, 148b to interconnect them. Each center link 150 is circumferentially disposed between two planet gears, and therefore the center links 150 are circumferentially offset from the openings 149 in the carrier plates 148a, 148b within which the journal bearings of the planet gears are mounted. As can be seen in FIG. 5, the center links 150 of the planet carrier 140 are axially interrupted, in that an axial gap 190 is formed at an axial end of the radially outmost end 152 of the center links 150. The axial gap 190 separates the first carrier plate 148a from the outermost end 152 of the center links 150. This may more efficiently decouple the first and second carrier plates 148a, 148b.

The embodiments described above are intended to be exemplary only. For example, although an epicyclic configuration with three planet gears is described, any suitable number of planet gears can be employed. The planet carrier 40 and the epicyclic gear train 27 as described herein can be applicable to a gearbox and/or gear train having single reduction stage, a double reduction stage, or a gear train with more than two reduction stages. One skilled in the art will appreciate that the present gear train and gear box configuration described also has application well beyond the gas turbine engine example described.

The invention claimed is:

1. An epicyclic gear train defining a central longitudinal axis, the epicyclic gear train comprising:
   a central sun gear, an outer ring gear, and a number of planet gears which are mounted to a planet carrier, the planet gears rotating about respective planet gear axes, the planet gears disposed in meshed engagement with the central sun gear and the outer ring gear;
   the planet carrier including
      a centrally disposed torque transfer coupling concentric with the longitudinal axis and having a torque transmission point at an axial end of the torque transfer coupling; and
      first and second carrier plates extending radially from the torque transfer coupling, the first and second carrier plates being parallel to each to each other and axially spaced apart to support the planet gears therebetween at aligned gear mounting points on each of the first and second carrier plates;
      wherein the planet carrier has center links extending radially outward relative to the longitudinal axis and axially disposed between the carrier plates, the carrier plates being connected to the torque transfer coupling only by the center links, the first carrier plate being closer to the torque transfer point than the second carrier plate, and the second carrier plate having a stiffness that is greater than that of the first carrier plate.

2. The epicyclic gear train as defined in claim 1, wherein the torque transfer coupling, the center links and the first and second carrier plates are integrally formed as a single-piece to provide the planet carrier with a monolithic body.

3. The epicyclic gear train as defined in claim 1, wherein the second carrier plate occupies a greater overall volume in space than does the first carrier plate.

4. The epicyclic gear train as defined in claim 1, wherein the first carrier plate is circumferentially discontinuous and formed by a number of circumferentially spaced apart finger portions, and the second carrier plate extends circumferentially fully about the planet carrier.

5. The epicyclic gear train as defined in claim 1, wherein the second carrier plate has an axial thickness that is greater than an axial thickness of the first carrier plate.

6. The epicyclic gear train as defined in claim 1, wherein the second carrier plate is structurally reinforced to a greater extent than the first carrier plate.

7. The epicyclic gear train as defined in claim 1, wherein the center links are circumferentially offset from the gear mounting points on the first and second carrier plates and from the planet gears mounted thereto.

8. The epicyclic gear train as defined in claim 1, wherein the center links include axially extending bridges that interconnect the first and second carrier plates at their radially outer perimeter.

9. An epicyclic gear train comprising;
   a sun gear, an outer ring gear, and a number of planet gears which are mounted to a planet carrier and disposed radially between the sun gear and the outer ring gear in meshing engagement therewith to provide relative rotational motion at least between the planet carrier and the outer ring gear, the sun gear, the outer ring gear and the planet carrier being concentric with a central longitudinal axis; and
   the planet carrier including
      a carrier body having a central tubular portion concentric with the longitudinal axis, and
      first and second carrier plates extending radially outward from the central tubular portion, the first and second carrier plates axially spaced apart from each other by center links to support the planet gears therebetween, the first and second carrier plates being connected to the central tubular portion only by the center links,
      wherein the central tubular portion defines a torque transmission means at an axial end thereof, the first carrier plate being closer to the torque transmission means than the second carrier plate, and the second carrier plate having a greater stiffness than the first carrier plate.

10. The epicyclic gear train as defined in claim 9, wherein the central tubular portion, the center links and the first and second carrier plates are integrally formed as a single-piece to render the carrier body monolithic.

11. The epicyclic gear train as defined in claim 9, wherein the second carrier plate occupies a greater overall volume in space than does the first carrier plate.

12. The epicyclic gear train as defined in claim 9, wherein the first carrier plate is circumferentially discontinuous and formed by a number of circumferentially spaced apart finger portions, and the second carrier plate extends circumferentially fully about the planet carrier.

13. The epicyclic gear train as defined in claim 9, wherein the second carrier plate has an axial thickness that is greater than an axial thickness of the first carrier plate.

14. The epicyclic gear train as defined in claim 9, wherein the second carrier plate is structurally reinforced to a greater extent than the first carrier plate.

15. The planet carrier as defined in claim 9, wherein the center links are circumferentially equidistantly spaced about the planet carrier and are circumferentially offset from gear mounting points on the first and second carrier plates at which the planet gears are rotatably mounted to the planet carrier.

16. The epicyclic gear train as defined in claim 9, wherein the center links extending radially outward relative to the longitudinal axis and are entirely disposed between the carrier plates.

17. The epicyclic gear train as defined in claim 16, wherein the center links include axially extending bridges that interconnect the first and second carrier plates at their radially outer perimeter.

\* \* \* \* \*